(12) United States Patent
Hwang

(10) Patent No.: US 9,733,132 B2
(45) Date of Patent: Aug. 15, 2017

(54) IN-MOLD TRANSFER FILM WHICH CHANGES ITS COLOR ACCORDING TO A TEMPERATURE AND WHICH HAS A SCENT-EMITTING FUNCTION AND METHOD FOR MANUFACTURING SAME

(71) Applicant: LG Hausys, Ltd., Seoul (KR)

(72) Inventor: Jae Bong Hwang, Busan (KR)

(73) Assignee: LG HAUSYS, LTD., Seoul (KR)

( * ) Notice: Subject to any disclaimer, the term of this patent is extended or adjusted under 35 U.S.C. 154(b) by 605 days.

(21) Appl. No.: 14/344,218

(22) PCT Filed: Sep. 21, 2012

(86) PCT No.: PCT/KR2012/007568
§ 371 (c)(1),
(2) Date: Mar. 11, 2014

(87) PCT Pub. No.: WO2013/048064
PCT Pub. Date: Apr. 4, 2013

(65) Prior Publication Data
US 2014/0230717 A1  Aug. 21, 2014

(30) Foreign Application Priority Data
Sep. 30, 2011  (KR) .................. 10-2011-0100299

(51) Int. Cl.
*G01K 11/14* (2006.01)
*B41M 5/165* (2006.01)
(Continued)

(52) U.S. Cl.
CPC .............. *G01K 11/14* (2013.01); *B29C 45/14* (2013.01); *B29C 45/14778* (2013.01);
(Continued)

(58) Field of Classification Search
None
See application file for complete search history.

(56) References Cited

U.S. PATENT DOCUMENTS

2006/0177649 A1    8/2006  Clark et al.
2008/0116213 A1*   5/2008  Schlaupitz .......... B29C 47/0026
                                                    220/694
2012/0003441 A1*   1/2012  Chen ...................... B32B 27/08
                                                    428/206

FOREIGN PATENT DOCUMENTS

CN         201212120 Y      3/2009
JP         0692087 A        4/1994
                (Continued)

OTHER PUBLICATIONS

Machine Translation of JP 2007-098778.*
(Continued)

*Primary Examiner* — Mark Ruthkosky
*Assistant Examiner* — Sathavaram I Reddy
(74) *Attorney, Agent, or Firm* — Hauptman Ham, LLP

(57) ABSTRACT

An in-mold transfer film includes a release layer, a scent-emitting hard layer, a color-changing print layer and an adhesive layer formed sequentially in one direction on one side of a base layer, wherein the scent-emitting hard layer includes aromatic microcapsules, and the color-changing print layer changes its color according to the temperature. An method for manufacturing an in-mold transfer film includes the following steps: forming a release layer on one side of a base layer; forming a scent-emitting hard layer on an upper surface of the release layer; forming a print primer layer on an upper surface of the scent-emitting hard layer; forming a color-changing print layer formed on an upper surface of the print primer layer; forming an adhesive primer
(Continued)

layer on an upper surface of the color-changing print layer; and forming an adhesive layer on an upper surface of the adhesive primer layer.

11 Claims, 4 Drawing Sheets

(51) Int. Cl.
    *B41M 5/28*     (2006.01)
    *B41M 5/382*     (2006.01)
    *B32B 33/00*     (2006.01)
    *B29C 45/14*     (2006.01)
    *B32B 37/24*     (2006.01)
    *B32B 38/00*     (2006.01)
    *B29K 105/00*     (2006.01)

(52) U.S. Cl.
    CPC .............. *B32B 33/00* (2013.01); *B41M 5/165* (2013.01); *B41M 5/287* (2013.01); *B41M 5/38271* (2013.01); *B29K 2105/0029* (2013.01); *B32B 2037/243* (2013.01); *B32B 2038/0076* (2013.01); *B32B 2307/402* (2013.01)

(56) References Cited

FOREIGN PATENT DOCUMENTS

| | | |
|---|---|---|
| JP | 07156533 A | 6/1995 |
| JP | 07276777 A | 10/1995 |
| JP | 2006095795 A | 4/2006 |
| JP | 2007004941 A | 1/2007 |
| JP | 2007098778 A | 4/2007 |
| JP | 2007307821 A | 11/2007 |
| JP | 2008049609 A | 3/2008 |
| JP | 2010106135 A | 5/2010 |
| KR | 20040024061 A | 3/2004 |
| KR | 100819438 B1 | 4/2008 |
| KR | 20090078883 A | 7/2009 |
| KR | 20090085185 A | 8/2009 |
| KR | 20110064367 A | 6/2011 |

OTHER PUBLICATIONS

Chinese Office Action dated Sep. 30, 2014.
Japanese Office Action dated Dec. 2, 2014.
Japanese Notice of Allowance for application No. 2014-531721 mailed on Apr. 7, 2015.
International Search Report mailed on Feb. 28, 2013 for PCT/KR2012/007568.

* cited by examiner

IN-MOLD TRANSFER FILM WHICH CHANGES ITS COLOR ACCORDING TO A TEMPERATURE AND WHICH HAS A SCENT-EMITTING FUNCTION AND METHOD FOR MANUFACTURING SAME

CROSS REFERENCE TO RELATED APPLICATION

This application claims the priority of Korean Patent Application No. 10-2011-0100299 filed on Sep. 30, 2011 in the Korean Patent and Trademark Office. Further, this application is the National Phase application of International Application No. PCT/KR2012/007568 filed on Sep. 21, 2012, which is incorporated herein by reference in its entirety.

TECHNICAL FIELD

The present invention relates to an in-mold transfer film which includes a scent-emitting hard layer including aromatic microcapsules and a color-changing print layer, a color of which is changed according to temperature, and a method of manufacturing the same.

BACKGROUND ART

In recent years, according to tastes of younger people, major consumers of electric and electronic products, various attempts have been made to improve not only functionality but also aesthetics, i.e. color or design. However, typical in-mold transfer films used for decoration can express only a color based on a color ink layer transferred to a surface thereof without providing other functions, such as a function of emitting various aromas.

Korean Patent Laid-open Publication No. 2004-0024061 discloses an aromatic transfer film, which is prepared by applying a flavoring agent to one of a release agent, an ink, and an adhesive so as to provide an olfactory effect. In addition, Korean Patent Laid-open Publication No. 2009-0078883 discloses a transfer film, which includes various patterns printed thereon to be squeezed and transferred to appliances. However, the transferred pattern does not produce a visual effect of changing color according to temperature, thereby making it difficult to confirm a thermal state of an appliance to which the printed pattern is transferred.

DISCLOSURE

Technical Problem

An aspect of the present invention is to provide an in-mold transfer film allowing a color of a printed pattern to be changed according to temperature and emitting fragrance after a transfer process.

Another aspect of the present invention is to provide a method of manufacturing an in-mold transfer film according to the above aspect.

Technical Solution

In accordance with an aspect of the present invention, an in-mold transfer film includes a release layer, a scent-emitting hard layer, a color-changing print layer, and a bonding layer sequentially formed on one surface of a base layer, wherein the scent-emitting hard layer includes aromatic microcapsules and a color of the color-changing print layer is changed according to temperature.

In accordance with another aspect of the present invention, a method of manufacturing an in-mold transfer film includes: forming a release layer on one surface of a base layer; forming a scent-emitting hard layer on an upper side of the release layer; forming a printed primer layer on an upper side of the scent-emitting hard layer; forming a color-changing print layer on an upper side of the printed primer layer; forming a bonding primer layer on an upper side of the color-changing print layer; and forming a bonding layer on an upper side of the bonding primer layer, wherein the scent-emitting hard layer includes aromatic microcapsules and a color of the color-changing print layer is changed according to temperature.

Advantageous Effects

According to the present invention, the in-mold transfer film is mounted on an injection-molded product to provide a visual effect by which the injection-molded product is changed in color according to temperature, to remove inherent smell of the injection-molded product so as to relieve consumer dissatisfaction, and to allow a scent-emitting hard layer attached to the injection-molded product to emit fragrance so as to attract consumer interest in the product.

In the method of manufacturing an in-mold transfer film, the in-mold transfer film emitting fragrance can be easily manufactured by a screen printing process using a squeezer, with a color-changing print layer including color-changeable microcapsules formed thereon.

BEST MODE

Hereinafter, embodiments of the present invention will be described in detail with reference to the accompanying drawings. Here, it should be understood that the present invention may be embodied in different ways, and that the scope of the present invention is not limited to the following embodiments.

Figure 1:
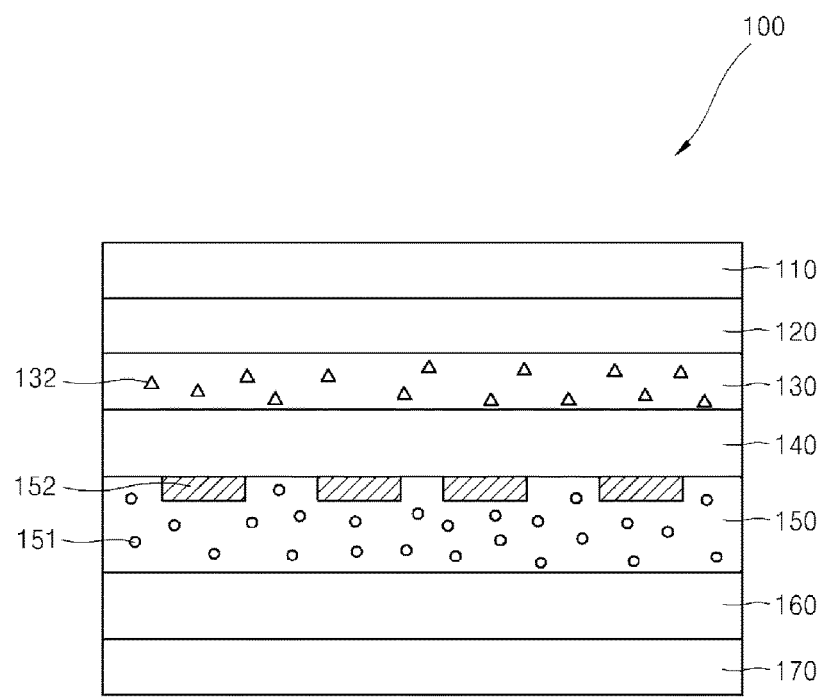
FIG. 1 is a sectional view of an in-mold transfer film according to one embodiment of the present invention.

Referring to FIG. 1, an in-mold transfer film 100 according to one embodiment includes a base layer 110, a release layer 120, a scent-emitting hard layer 130, a color-changing print layer 150, and a bonding layer 170.

The base layer 110 may be formed of at least one selected from among polyethylene terephthalate (PET), polycarbonate (PC), polypropylene (PP), and acrylic resins.

The release layer 120 is formed on one surface of the base layer 110 and is a layer formed to remove the base layer 110 from an injection-molded product (not shown), which is formed by injection-molding a molten resin with the in-mold transfer film 100 inserted into a mold for injection molding.

Here, the release layer 120 may be formed of at least one selected from epoxy, epoxy-melamine, amino-alkyd, acrylic, melamine, silicone, fluorine, cellulose, urea, polyolefin, and paraffin resins on one surface of the base layer 110 by a screen printing process using a squeezer.

The release layer 120 may be formed to a thickness of 2 to 7 μm. If the thickness of the release layer 120 is less than 2 μm, it is difficult to realize a three-dimensional texture for the color-changeable print layer 150 to be formed below the release layer 120. If the thickness of the release layer 120 exceeds 7 μm, the release agent cannot be cured, thereby making it difficult to achieve separation upon injection molding due to change with time.

The scent-emitting hard layer 130 is formed on an outer surface of the release layer 120 and includes aromatic microcapsules 132 to prevent the color-changing print layer 150 described below from being scratched during injection molding and to emit fragrance.

The scent-emitting hard layer 130 may include 30% by weight (wt %) to 50 wt % of the aromatic microcapsules 132, which includes at least one of acrylic polymers, urethane polymers, epoxy polymers, siloxane polymers and mixtures thereof, and a ultraviolet-curable resin, such as an oligomer, as main components. The scent-emitting hard layer 130 may further include silica fillers to improve strength.

Here, the aromatic microcapsule 132 has a diameter of 3 μm to 10 μm, and includes a thin-film capsule formed of one resin, which is selected from among soft synthetic resins including urea and melamine resins, and a natural or artificial flavoring component in the capsule.

The aromatic microcapsules 132 are present in an amount of 30 wt % to 50 wt % in the scent-emitting hard layer 130. If the content of the aromatic microcapsules 132 is less than 30 wt %, the scent-emitting hard layer 130 cannot maintain an aromatizing function. If the content of the aromatic microcapsules 132 exceeds 50 wt %, the scent-emitting hard layer 130 has reduced strength.

Further, the natural flavoring included in the aromatic microcapsules 132, i.e. a natural oil flavoring component, can be obtained from 300 kinds of plants that emit fragrance, and can be extracted from flowers, leaves, stalks, or roots. In general, the artificial flavoring is prepared through modification of a chemical structure, whereas the natural oil flavoring has pure natural vegetable fragrance as an aroma scent.

A printed primer layer 140 is interposed between the scent-emitting hard layer 130 and the color-changing print layer 150 described below, and reinforces adhesive strength of the color-changing print layer 150. The printed primer layer 140 may be formed by adding metal oxide particles or a curing catalyst to at least one of urethane, modified acrylic, polyisocyanate, and polyol resins as a main component.

Like the printed primer layer 140, the color-changing print layer 150 formed of at least one of urethane, modified acrylic, polyisocyanate, and polyol resins as a main component, and includes color-changeable capsules 151 and a printed pattern 152 formed on one side thereof and containing a print ink therein.

The color-changeable capsules 151 contain a thermochromic or photochromic ink therein and have a diameter of 1 μm to 5 μm. The thermochromic ink and the photochromic ink are very sensitive to an external environment, and may act as a protective layer of the capsule composed of a coating resin.

Here, the thermochromic ink may include, for example, Zion ink or $C_{21}H_{16}N_2$. The photochromic ink may include an organic compound, such as silver halide, spiropyran, spirooxazine, azo compounds, or diarylethene, or an inorganic compound, such as a tungsten compound.

Further, the color-changeable capsule 151 may further include additives such as an anti-settling agent and an anti-foaming agent.

The anti-settling agent may include an inorganic material, such as silica, alumina, kaolinite, bentonite, dolomite, barite ($BaSO_4$), calcium carbonate ($CaCO_3$), talc, titania, or diatomite, in order to prevent particles constituting a color-changeable ink composition from settling. Particularly, since the photochromic ink requires reactivity to light, the photochromic ink preferably includes the anti-settling agent based on transparent silicon such as silica. Here, the anti-settling agent is preferably added in an amount of 0.1 parts by weight to 3 parts by weight based on 100 parts by weight of the photochromic ink.

The anti-foaming agent may include a polysiloxane antifoaming agent in order to prevent bubbling upon formation or transfer of the color-changing print layer 150, or to suppress formation of pin holes due to bubbling upon transfer of the color-changing print layer 150. Here, the anti-foaming agent is preferably added in an amount of 0.01 parts by weight to 3 parts by weight based on 100 parts by weight of the photochromic ink.

The color-changeable capsules 151 may be present in an amount of 30 wt % to 50 wt % in the color-changing print layer 150 or only in the printed pattern 152. When the color-changeable capsules 151 are embedded only in the printed pattern 152, the color-changeable capsules 151 may fill in the printed pattern 152 without using the print ink.

Here, when the amount of the color-changeable capsules 151 is less than 30 wt %, color reproducibility and degree of distribution can be reduced. However, when the amount of the color-changeable capsules 151 is in the range from 30 wt % to 50 wt %, both color reproducibility and degree of distribution are good.

A bonding primer layer 160 is interposed between the color-changing print layer 150 and the bonding layer 170 described below to reinforce adhesive strength. The bonding primer layer 160 may be formed by adding metal oxide particles or a curing catalyst to at least one of urethane, modified acrylic, polyisocyanate, and polyol resins as a main component.

The bonding layer 170 is formed on a lower side of the bonding primer layer 160 in order to attach the transfer film 100 to an injection-molded product. The bonding layer 170 may be formed by applying an adhesive such as polyester, polyurethane, acrylic, ethylene co-vinyl acetate (EVA), or polyvinyl acetate (PVA) to a proper thickness by one of screen printing using a squeezer, gravure printing, flexo-printing, micro-gravure printing, comma coating, and roll coating, followed by curing the applied adhesive at a predetermined temperature.

The in-mold transfer film 100 is transferred to the injection-molded product. When the scent-emitting hard layer 130 is pressed or rubbed, the aromatic microcapsules 132 are destroyed to emit fragrance. Thus, inherent smell of the injection-molded product is removed to relieve consumer dissatisfaction, and the injection-molded product allows the scent-emitting hard layer to emit fragrance, thereby attracting consumer's interest in the product.

In addition, the color-changeable capsules 151 included in the color-changing print layer 150 can provide a visual effect by which the printed pattern transferred to the injection-molded product is changed in color according to temperature, thereby making it possible to confirm a thermal state of the injection-molded product to which the printed pattern is transferred.

Figure 2:
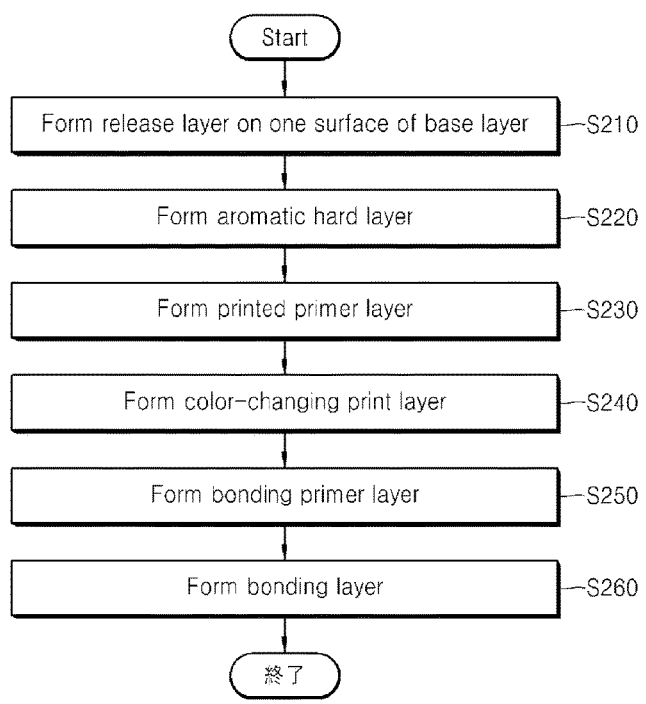
FIG. 2 is a flowchart of a method of manufacturing an in-mold transfer film according to one embodiment of the present invention.
Figure 3:
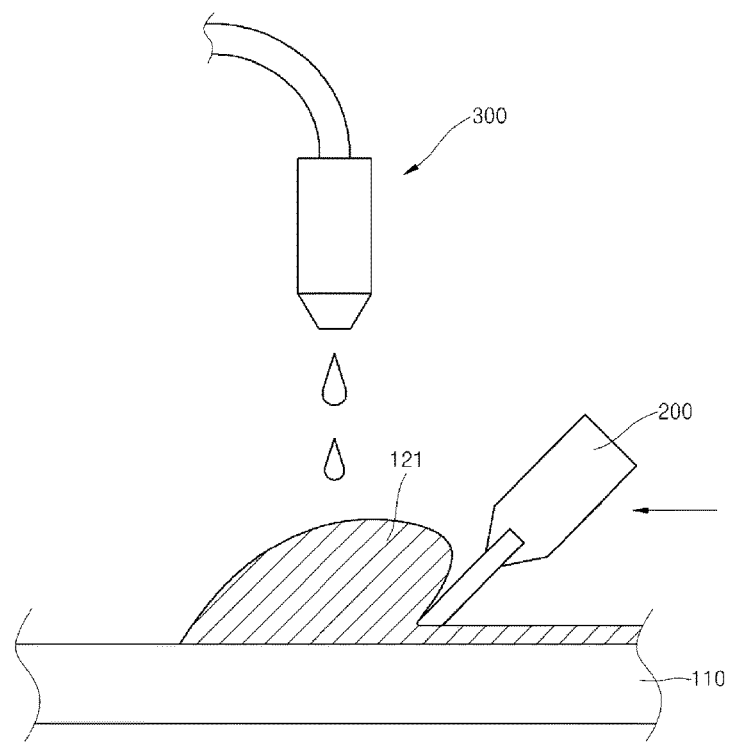
FIG. 3 is a diagram illustrating a screen printing process according to one embodiment of the present invention.
Figure 4:
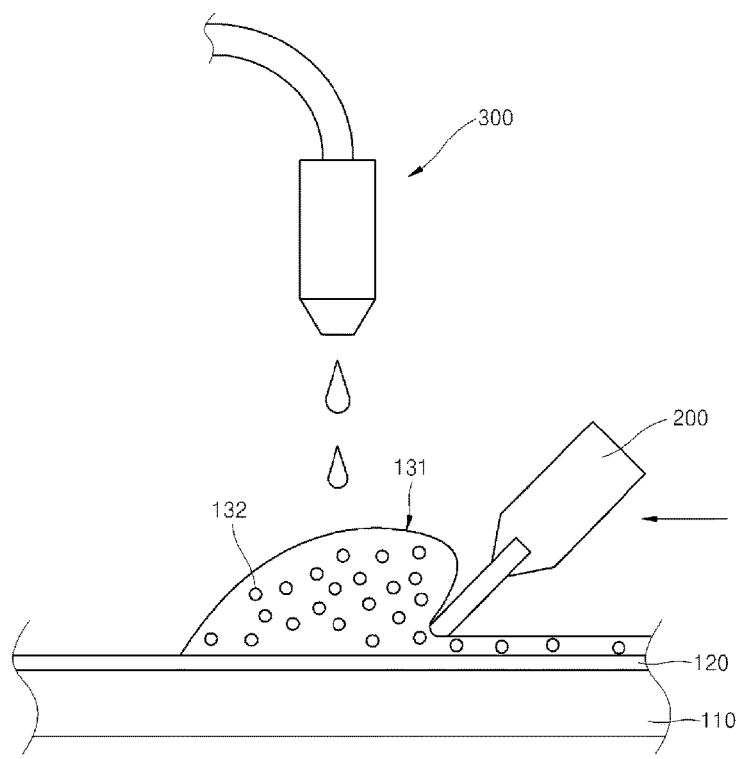
FIG. 4 is a diagram illustrating a process of forming a scent-emitting hard layer according to one embodiment of the present invention.

Hereinafter, a method of manufacturing an in-mold transfer film according to one embodiment of the invention will be described with reference to FIG. 2. FIG. 2 is a flowchart of a method of manufacturing an in-mold transfer film according to one embodiment of the present invention. FIG. 3 is a diagram illustrating a screen printing process according to one embodiment of the present invention, and FIG. 4 is a diagram illustrating a process of forming a scent-emitting hard layer according to one embodiment of the present invention.

Referring to FIG. 2, a method of manufacturing an in-mold transfer film 100 according to one embodiment of the invention includes supplying slurry droplets 121 including a release agent to one surface of a base layer 110, followed by forming a release layer 120 through screen printing using a squeezer (S210).

Specifically, as shown in FIG. 3, in the screen printing process using a squeezer, a predetermined amount of slurry 121 including the release agent is supplied dropwise to the base layer 110 through a nozzle 300 placed above the base layer 110 mounted on a stage (not shown). Here, the release agent may include at least one selected from among epoxy, epoxy-melamine, amino-alkyd, acrylic, melamine, silicone, fluorine, cellulose, urea, polyolefin, and paraffin resins.

Thereafter, the slurry 121 is applied to a predetermined thickness on the base layer 110 by a squeezer 200 and then is cured to form the release layer 120 by one of heating, ultraviolet (UV), and infrared (IR) irradiation.

After the release layer 120 is formed, a scent-emitting hard layer 130 is formed on an upper side of the release layer 120 (S220).

Specifically, as in operation of forming the release layer 120 (S210) as shown in FIG. 3, a predetermined amount of slurry 131 including a material for the scent-emitting hard layer 130 and aromatic microcapsules 132 is supplied dropwise onto the upper side of the release layer 120 through a nozzle 300.

Then, the slurry 131 is applied to the upper side of the release layer 120 to form a slurry layer by screen printing using the squeezer 200. This layer is cured into the scent-emitting hard layer 130 in a furnace at 140° C. to 170° C.

The slurry 131 may include 30 wt % to 50 wt % of the aromatic microcapsules 132, which include at least one of acrylic polymers, urethane polymers, epoxy polymers, siloxane polymers and mixtures thereof, and an ultraviolet-curable resin, such as an oligomer, as main components. Moreover, the slurry 131 may further include silica fillers in order to improve strength of the scent-emitting hard layer 130.

After the scent-emitting hard layer 130 is formed, a printed primer layer 140 is formed on an upper side of the scent-emitting hard layer 130 (S230).

Formation of the printed primer layer 140 (S230) may include forming and curing a slurry layer including a material for the primer layer 140 on the upper side of the scent-emitting hard layer 130 by deposition or screen printing. Here, the slurry including the material for the printed primer layer 140 may be prepared by adding metal oxide particles or a curing catalyst to at least one of urethane, modified acrylic, polyisocyanate, and polyol resins as a main component.

After the printed primer layer 140 is formed, a color-changing print layer 150 is formed on an upper side of the printed primer layer 140 (S240).

Specifically, formation of the color-changing print layer 150 (S240) may include applying a slurry including color-changeable capsules 151, which includes at least one of urethane, modified acrylic, polyisocyanate, and polyol resins as a main component, to the upper side of the printed primer layer 140 through screen printing using a squeezer, and curing the applied layer by one of heating, UV, and IR irradiation.

Then, an upper side of the cured layer is subjected to etching to form a printed pattern 152, which contains a print ink embedded therein.

Alternatively, formation of the color-changing print layer 150 (S240) may include forming the printed pattern 152 through gravure printing or flexo-printing.

Further, upon formation of the color-changing print layer 150 (S240), the color-changeable capsules 151 may be buried only in the printed pattern 152 formed on the upper side of the cured layer instead of the slurry. Here, the color-changeable capsules 151 may have a diameter of 1 to 5 µm and may be present in an amount of 30 wt % to 50 wt % in the color-changing print layer 150 or only in the printed pattern 152.

Particularly, when the amount of the color-changeable capsules 151 is less than 30 wt % in the color-changing print layer 150, color reproducibility and degree of distribution can be reduced. However, when the amount of the color-changeable capsules 151 is in the range from 30 wt % to 50 wt %, both color reproducibility and degree of distribution are good.

After the color-changing print layer 150 is formed, a bonding primer layer 160 is formed on an upper side of the color-changing print layer 150 (S250).

Specifically, formation of the bonding primer layer 160 (S250) may include forming and curing a slurry layer including a material for the bonding primer layer 160 on the upper side of the color-changing print layer 150 through deposition or screen printing. Here, the slurry including the material for the bonding primer layer 160 may be prepared by adding metal oxide particles or a curing catalyst to at least one of urethane, modified acrylic, polyisocyanate, and polyol resins as a main component.

After the bonding primer layer 160 is formed, a bonding layer 170 is formed on an upper side of the bonding primer layer 160 (S260).

Formation of the bonding layer 170 (S260) is performed by screen printing using a squeezer as shown in FIG. 3, for example, by applying a slurry including an adhesive such as polyester, polyurethane, acrylic, ethylene co-vinyl acetate (EVA), or polyvinyl acetate (PVA) to a proper thickness, followed by curing the slurry at a predetermined temperature.

Alternatively, formation of the bonding layer 170 (S260) is performed by one of gravure printing, flexo-printing, micro-gravure printing, coma coating, and roll coating.

The in-mold transfer film 100 manufactured by the method according to the embodiment may be mounted on an injection-molded product, which is formed by injection molding of a molten resin with the in-mold transfer film inserted into a mold for injection molding.

When the in-mold transfer film 100 is mounted on the injection-molded product, the release layer is removed and the scent-emitting hard layer 130 is exposed to the outside. The aromatic microcapsules 132 included in the scent-emitting hard layer 130 are destroyed by friction or heat generated upon pressing or rubbing the scent-emitting hard layer 130, whereby an aromatic component of the aromatic microcapsules 132 is volatized to emit fragrance. Particularly, cracks are generated and propagated in the scent-emitting hard layer 130 by friction or heat to destroy the aromatic microcapsules 132. Therefore, the aromatic component oozes through the cracks, thereby emitting fragrance. Since the aromatic microcapsules 132 may be placed on a surface of the scent-emitting hard layer 130, fragrance may be emitted to the outside by the exposed aromatic microcapsules 132 as soon as the in-mold transfer film 100 is mounted on the injection-molded product.

Further, in the injection-molded product on which the in-mold transfer film 100 is mounted, the shape or color of the printed pattern is changed according to the temperature of the product or a surrounding temperature, which can be changed by light. Specifically, the injection-molded product shows a specific printed pattern and a specific color at a temperature lower than room temperature, and the specific printed pattern and the specific color can be changed into another printed pattern and another color at a temperature higher than room temperature.

As such, the in-mold transfer film according to the embodiment of the invention is mounted on the injection-molded product and provides a visual effect, by which the color of the injection-molded product is changed according to temperature, whereby a thermal state of the injection-molded product can be easily confirmed.

Although the present invention has been described with reference to some embodiments, it will be understood by those skilled in the art that these embodiments are provided for illustration only. In addition, it will be understood by those skilled in the art that various modifications, changes, alterations and equivalent embodiments can be made without departing from the scope and spirit of the present invention.

The invention claimed is:

1. An in-mold transfer film comprising:
   a release layer, a scent-emitting hard layer, a color-changing print layer, and a bonding layer sequentially formed on one surface of a base layer,
   wherein the scent-emitting hard layer comprises aromatic microcapsules and a color of the color-changing print layer is changed according to temperature, and
   wherein the scent-emitting hard layer comprises an ultraviolet-curable resin including an oligomer.

2. The in-mold transfer film according to claim 1, wherein the scent-emitting hard layer further comprises at least one selected from the group consisting of an acrylic polymer, a urethane polymer, an epoxy polymer, and a siloxane polymer.

3. The in-mold transfer film according to claim 1, wherein the aromatic microcapsules have a diameter of 3 µm to 10 µm, wherein the aromatic microcapsules comprise natural or artificial flavoring in capsules formed of a synthetic resin, and wherein the aromatic microcapsules are presented in an amount of 30 wt % to 50% in the scent-emitting hard layer.

4. The in-mold transfer film according to claim 1, wherein the scent-emitting hard layer further includes silica fillers to improve strength.

5. The in-mold transfer film according to claim 1, wherein the color-changing print layer is formed of at least one material selected from the group consisting of urethane, modified acrylic, polyisocyanate and polyol resins, wherein the color-changing print layer comprises color-changeable capsules, and wherein the color-changing print layer has a printed pattern formed on one side thereof and wherein the printed pattern is formed from a print ink embedded in the color-changeable print layer.

6. The in-mold transfer film according to claim 1, wherein the color-changing print layer is formed of at least one material selected from urethane, modified acrylic, polyisocyanate and polyol resins, and wherein the color-changing print layer has a printed pattern formed on one side thereof and wherein the printed pattern has color-changeable capsules embedded therein.

7. The in-mold transfer film according to claim 6, wherein the color-changeable capsules comprises an additive and a thermochromic ink or a photochromic ink in capsules formed of a coating resin, and wherein the color-changeable capsules have a diameter of 1 µm to 5 µm.

8. The in-mold transfer film according to claim 7, wherein the thermochromic ink includes Zion ink or $C_{21}H_{16}N_2$.

9. The in-mold transfer film according to claim 7, wherein the photochromic ink includes at least one selected from the group consisting of silver halide, spiropyran, spirooxazine, an azo compound, diarylethene, and a tungsten compound.

10. The in-mold transfer film according to claim 7, wherein the additive comprises an anti-settling agent and an anti-foaming agent, the anti-settling agent comprises one selected from the group consisting of silica, alumina, kaolinite, bentonite, dolomite, barite ($BaSO_4$), calcium carbonate ($CaCO_3$), talc, titania and diatomite, wherein the anti-settling agent is added in an amount of 0.1 parts by weight to 3 parts by weight based on 100 parts by weight of the photochromic ink, wherein the anti-foaming agent is a polysiloxane anti-foaming agent and wherein the anti-foaming agent is added in an amount of 0.01 parts by weight to 3 parts by weight based on 100 parts by weight of the photochromic ink.

11. The in-mold transfer film according to claim 6, wherein the color-changeable capsules are present in an amount of 30 wt % to 50 wt % in the color-changing print layer.

* * * * *